United States Patent [19]
Poll et al.

[11] Patent Number: 5,137,428
[45] Date of Patent: Aug. 11, 1992

[54] VENTILATING DEVICE

[75] Inventors: Henny Poll, Utrecht; Teunis Benschop, Lopik, both of Netherlands

[73] Assignee: Indolec B.V., Utrecht, Netherlands

[21] Appl. No.: 620,150

[22] Filed: Nov. 30, 1990

[51] Int. Cl.⁵ ............................................. F04D 27/00
[52] U.S. Cl. ........................................ 417/45; 417/42; 318/727
[58] Field of Search ........................... 417/45, 42, 22; 318/727

[56] References Cited

U.S. PATENT DOCUMENTS

| | | |
|---|---|---|
| 4,245,370 | 1/1981 | Baker . |
| 4,307,325 | 12/1981 | Saar . |
| 4,489,263 | 12/1984 | Potter et al. ........................ 318/727 |
| 4,513,233 | 4/1985 | Giammarrusco . |
| 4,709,197 | 11/1987 | Goldhammer et al. . |
| 4,958,118 | 9/1990 | Pottebaum ........................... 318/727 |

FOREIGN PATENT DOCUMENTS

| | | |
|---|---|---|
| 0175435 | 8/1986 | Japan ..................................... 417/45 |
| 1353738 | 8/1974 | United Kingdom . |
| 2117144A | 10/1983 | United Kingdom ................. 318/727 |

*Primary Examiner*—Richard A. Bertsch
*Assistant Examiner*—David W. Scheuermann
*Attorney, Agent, or Firm*—Bachman & LaPointe

[57] ABSTRACT

Ventilating device, comprising a fan, an electromotor coupled with the fan for driving the latter, a controllable excitation circuit coupled with the motor, and means for detecting the rotational speed of the fan. These means are adapted for the detection of rotation of the fan under a predetermined minimum speed upon which the excitation of the motor can be adapted. The excitation circuit comprises means for gradually speeding up the fan, departing from the standstill position and means for temporarily increasing up to the maximum of the excitation of the motor in response to the detection of the rotation of the fan under the predetermined minimum speed. As speed detection means a measuring fan is provided.

8 Claims, 3 Drawing Sheets

VENTILATING DEVICE

BACKGROUND OF THE INVENTION

The invention relates to a ventilating device, comprising a fan, an electromotor coupled with the fan for driving the latter, a controllable excitation circuit coupled with the motor, and means for detecting the rotational speed of the fan coupled with the excitation circuit.

Ventilating devices of this type widely are used in practice, e.g. for air refreshing purposes, whereby exhaust or polluted air or other gases are removed from a room and/or whereby clean air is supplied to a room. Other applications consist in removing hot air, supplying gas or air to combustion ovens and the like.

In some industrial applications, especially in the agricultural sector, the ventilating device and the direct vicinity thereof can be polluted by dust deposit and other pollution to such an extent, that the fan finally gets blocked. It is also possible, that such big parts are sucked out of the environment, that this causes a blocked fan as well. Standstill of the motor due to a blocked rotor generally leads to relatively high currents in the motor winding and the supply lines of the electrical installation. This can cause damage to the excitation circuit of the motor and an undesired heat-development in the motor and in the electrical installation, which leads to an increased fire risk.

In practice such an erroneous situation is usually detected by means of overload means and/or short-circuit means, whereby the excitation circuit is switched off. The U.S. Pat. No. 4,513,233 discloses an electronic monitoring circuit, suitable for this purpose, provided for monitoring the rotational speed of the electromotor.

Since, in practice, it is further common use to control several ventilating devices with one separate excitation circuit, as a consequence the occurrence of an erroneous situation in one ventilating device can disturb the functioning of the other ventilating devices as well. To prevent this, in practice, the separate ventilating devices are provided with a motor protection switch, which protects the motor of a ventilating device against overload currents and/or short-circuit. However, this leads to a more complicated and hence more expensive electrical installation.

SUMMARY OF THE INVENTION

It is an initial object of the present invention to provide a ventilating device, especially for industrial applications, with an improved protection against overload of the motor.

According to the invention, this object is achieved by providing means for the detection of the rotation of the fan under a predetermined minimum speed, under the influence of which the excitation of the motor can be adapted, and whereby the excitation circuit comprises means for gradually speeding up the fan, departing from standstill.

By incorporating means for the detection of the rotation of the fan under a predetermined minimum speed, the excitation of the motor can be adapted adequately, even before an intolerable high current or heat-development can occur.

In a further embodiment of the ventilating device according to the invention, the excitation circuit is provided for this purpose with means for temporarily increasing up to the maximum of the excitation of the motor in response to the detection of the rotation of the fan under the predetermined minimum speed.

The object of temporarily increasing the excitation of the motor is to subject the fan blades to such a high excitation power, that an eventual blocking thereof can be removed. The use of a so-called phase shift excitation circuit allows for increasing the excitation of the motor winding during a predetermined time up to its maximum value, in order that the fan is subjected to the maximum driving torque.

In addition thereto, or as a replacement of, in another further embodiment of the ventilating device according to the invention the excitation device is provided with means for interrupting the excitation of the motor, in each case in response to the detection of standstill of the fan.

The excitation circuit can be arranged such that the excitation of the motor, can be manually, via a reset signal, or automatically switched-on, which is possible because according to the invention the excitation circuit comprises means for gradually speeding up the fan, departing from standstill. This allows for compliance with the safety requirements, in that the automatic speeding up of a fan is only allowed, if this cannot cause damage to the environment. According to the invention this requirement is met, since the gradually speeding up of the fan by means of the motor torque is so small, that the fan, if necessary, can be stopped with low force, for example by hand, in response of which the excitation of the motor will be re-interrupted.

In yet another embodiment of the ventilating device according to the invention, auto-reset detection means are provided which are responsive to the motor temperature, for interrupting and re-establishing the excitation of the motor, respectively. With the aid of these means an undesired heat-development due to mechanical defects of the excitation of the fan, e.g. due to a defective bearing, can be detected and eliminated, before fire risk or irremediable damage of the ventilating device can occur. With the use of such detection means, for which a large number of heat sensors, known as such in practice can be applied, a separate motor protection switch can be omitted.

In an embodiment, adapted for setting the capacity of the ventilating device, the excitation circuit is provided with control means for controlling the motor speed, which control means, in response to the setting means for setting a desired motor speed and a tachometer device coupled with the motor, adapt the excitation of the motor, such that the latter rotates at the preset speed of revolutions, and whereby rotation of the fan under a predetermined minimum speed is detected from the signal provided by the tachometer device.

By using a plurality of such ventilation devices, e.g. for air refreshing purposes, each ventilation device can be separately and accurately controlled and monitored, whereby a defect in one ore more ventilating devices does not lead to a disconnection of the other, non-defect ventilating devices. Since each ventilating device is provided with its own excitation circuit, optimally adapted to the power of the motor, the phase-shift principle can be advantageously applied for this purpose, whereby as a result of mutual compensation of the different interference vectors of the excitation circuits, the total excited power for each phase of the electrical installation can be larger than in the case of one common phase-shift circuit for several, not separately excited motors of the ventilating device. It will be apparent that with an increase of the number of ventilating devices in one room, the electrical installation for feeding said ventilating devices can be cheaper when using the ventilating device according to the invention than when using a common excitation circuit for all off the ventilating devices in the respective room, as previously discussed.

For applications, whereby e.g. expensive heated air has to be refreshed, like for example in cow-houses for breeders, a great economical importance resides in displacing a desired quantity of air as accurately as possible. Due to pressure differences between the inlet and outlet sides of the ventilating device, the rotational speed of the fan can be an inaccurate criterion for the effectively displaced quantity of air.

In yet a further embodiment of the ventilating device according to the invention, the excitation circuit is provided with control means for controlling the motor speed, which control means, in response to setting means for setting a desired air displacement and a tachometer device coupled with a measuring fan, adapt the excitation of the motor, such that the latter rotates at the speed required for the desired air displacement, and whereby standstill of the fan is detected from the signal provided by the tachometer device.

Especially in large, high rooms, rising hot air can cause thermics. The occurrence of such a hot air flow can be detected by the measuring fan, to which the air displacement from the driven fan can be appropriately adapted, by means of its excitation circuit. The measuring fan can detect as well a change of direction of the air flow due to the thermic phenomenon. As a result, the rotational direction of the excited fan can, if necessary, be reversed, in order to control the air flow in the room as optimally as possible.

By incorporating the excitation circuit, the tachometer and the motor in a common housing, an effective protection against interference signals generated by the excitation circuit can be provided, whereby no attention has to be paid to the interference requirements, for example according to the E.E.C.-regulation no. 82/499, and whereby the primary interference requirements can be met by means of a simple electronic filter. This is one more reason to adapt a phase-shift excitation circuit, which in general can be realized in a more simple and cheap manner than frequency converters, known in practice, for the control of induction motors, and by which the motor can develop its maximum torque for each desired rotational speed, if necessary.

In accordance to the preferred embodiment of the invention, an accurate measurement of the quantity of displaced air can be provided by a measuring device wherein the measuring fan is arranged at the side of the inlet opening of the measuring tube, which measuring tube is provided with an outwardly tapered inlet flange.

By using a controllable excitation circuit according to the invention, the speed of the fan can be slowed down in a controlled manner, as opposed to fans of which only the driving can be switched on or off. Therefore, the ventilating device according to the invention offers the possibility of a very accurate control of the air flow, which, as already mentioned, can be necessary for a wide range of application fields. By offering the possibility of a remote signalization of the operation status of the fan or the motor, the ventilating device according to the invention can be appropriately used in automated, remote-controlled processes, both in the field of agriculture and industry.

The invention will now be described with reference to the preferred embodiment, provided with a one-phase induction motor and an excitation circuit based on the phase-shift principle, and taken in conjunction with the drawings.

DETAILED DESCRIPTION OF THE EMBODIMENT

Figure 1:
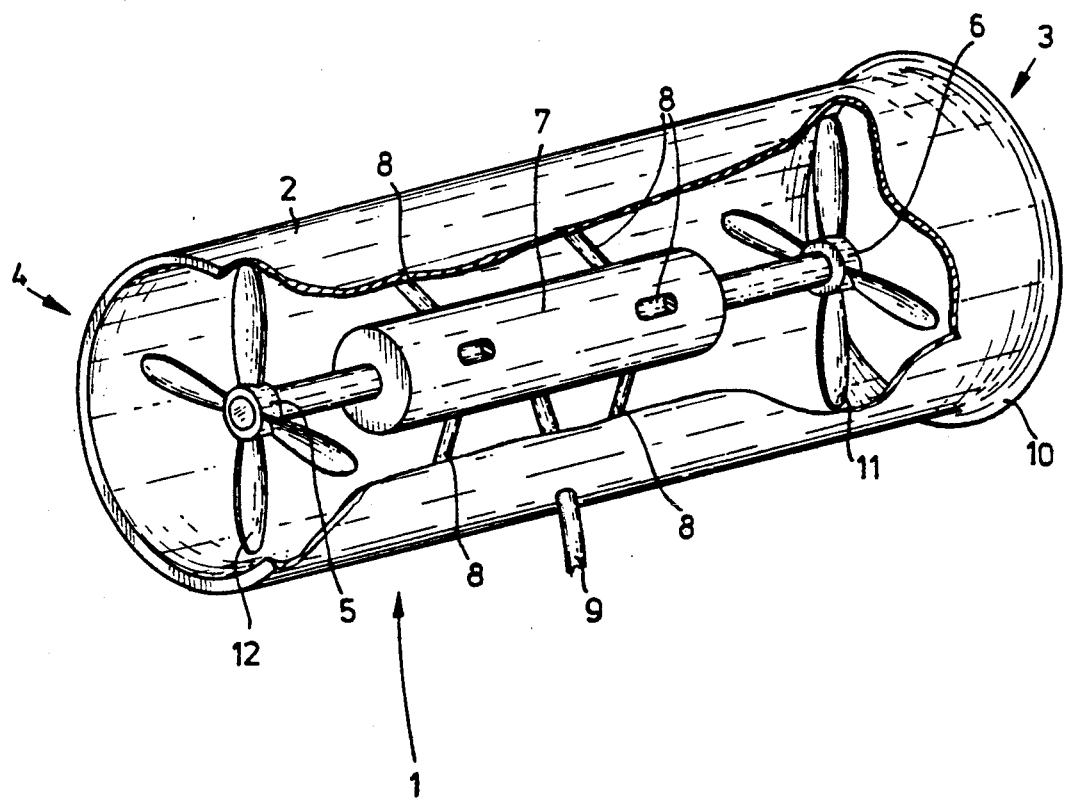
FIG. 1 is a schematic perspective and partially sectional view of an embodiment of the ventilating device with measuring fan according to the invention, and FIGS. 2(1) and FIGS. 2(2) are the electric diagram of an embodiment according to the invention of an excitation circuit for the excitation of the fan of the ventilating device shown in FIG. 1.

Referring to FIG. 1, the preferred embodiment of the ventilating device with measuring fan according to the invention is generally indicated with 1. The ventilating device comprises a measuring tube 2 with an inlet opening 3 and an outlet opening 4. The fan 5 driven by an electromoter is arranged near to the outlet opening 4 of the measuring tube 2. For an accurate measurement of the air displaced by the fan 5 through the measuring tube 2, a measuring fan 6 is arranged near to the inlet opening 3. In the present text, the term air displacement, implicitly refers to displacement of other gases as well, in addition to air.

Between the fans 5 and 6, spaced in axial direction of the measuring tube 2, there is provided a housing 7 of electrically conductive material, inside of which the motor for the driving of the fan 5 and the electric and electronic components of the excitation circuit, necessary for driving the motor, are arranged. The housing 7 is mounted in the measuring tube 2 by means of support bodies 8. For supplying electrical energy to the motor and the excitation circuit, an electrical cable 9 is provided, which is extends to the outside via an opening in the wall of the measuring tube 2.

To obtain a very accurate measurement of the quantity of air displaced through the measuring tube 2, the measuring fan 6 is arranged at the inlet opening of the measuring tube 2, as a result of which measuring errors due to air turbulences caused by the fan 5 can be prevented to a large extent. For this purpose, the measuring tube 2 is further provided with an outwardly tapered inlet flange 10 at its inlet opening.

In order to realize a minimum influence of the displaced quantity of air via the measuring tube 2, due to the presence of the measuring fan 6, said measuring fan advantageously comprises four blades 11, having their area arranged at an angle of 45° with respect to the area of the inlet opening 3. The number of blades 12 of the fan 5 driven by the motor, and their angular position depends, of course, on the desired capacity of the ventilating device and the power of the drive motor.

Via the cable 9 control signals are applied to the excitation circuit as well, which is incorporated in the housing 7. Since the housing 7 consists of an electrically conductive material, a very good shielding is obtained against interference signals, caused by the excitation circuit.

Because each ventilating device is provided with a corresponding excitation circuit in the room in which one or several of such ventilating devices have to be arranged, a relatively simple electrical installation can be installed. Each ventilating device can be directly connected to the power supply. For the supply of control signals to the excitation circuit a low-voltage current line is satisfactory, which is, in comparison to the power supply lines, subjected to less severe installation requirements. Especially in humid rooms this implies an important economical and safety-technical advantage.

Even though FIG. 1 shows the preferred embodiment of the ventilating device according to the invention in combination with a measuring fan, it is, like already mentioned in the introduction, not necessary for all applications to use a measuring fan 6. In such cases the quantity of displaced air is determined, although less accurately, on the basis of the rotational speed of the fan 5, driven by the electromotor. Of course, the advantages of the accommodation in a common housing of the excitation circuit and the motor are maintained.

In practice the measuring tube 2 has a diameter of 30–50 cm, and the quantity of air to be displaced can vary between 2000–10,000 $m^3/h$. For driving the fan 5, essentially any induction motor, suitable for controlled driving can be applied, having for example a power of approximately 400–500 W.

Figure 2:
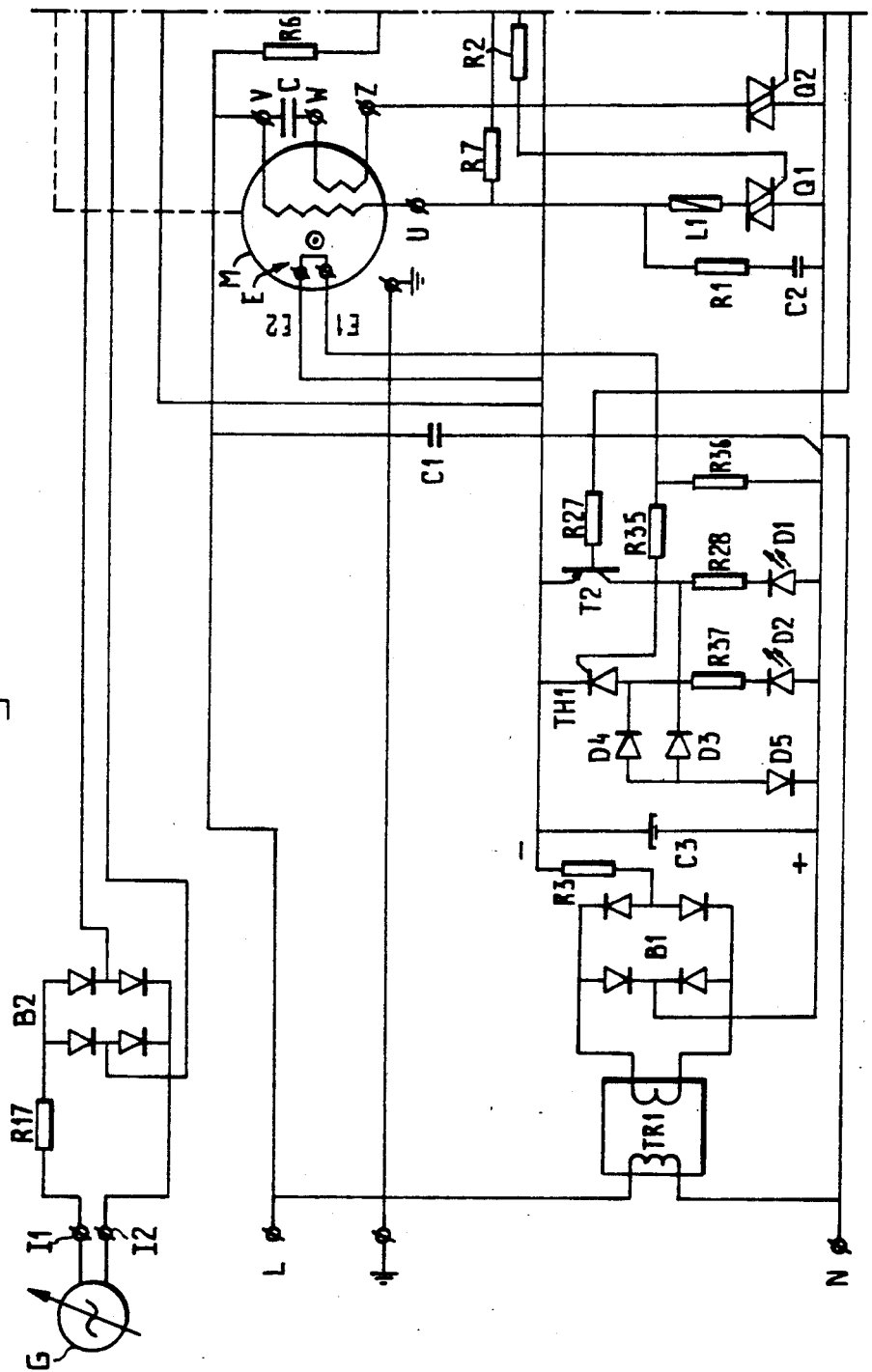
Figure 2A:
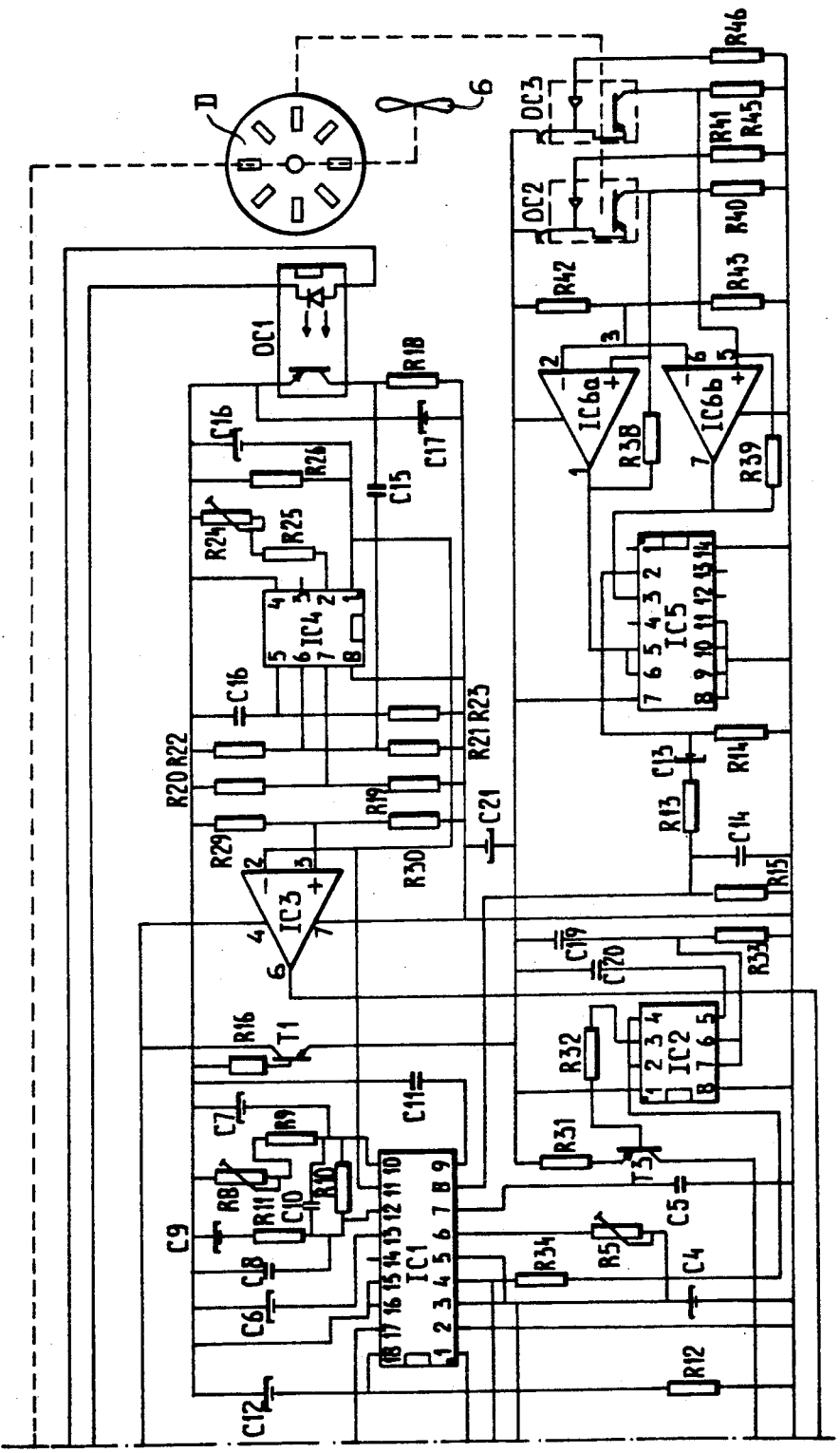

Referring to FIGS. 2(1) and 2(2), a practical embodiment of an excitation circuit is shown for driving and controlling the motor of the ventilating device according to FIG. 1. The motor M for driving the fan 5 (FIG. 1) is a one-phase capacitor motor with terminals U, V, W, Z, arranged in order to create an electric rotary field, the main winding of the motor being connected between the terminals U, V, the auxiliary winding between the terminals Z, W and the operation capacitor C between the terminals W, V. The excitation circuit functions according to the so-called phase-shift principle, the rotational speed of the motor M being varied by controlling the voltage across the main winding with the aid of a semi-conductor switch.

As a semi-conductor switch a TRIAC Q1of the TO 610 DJ type manufactured by T.A.G. is used, which is with one end connected to the neutral conductor (N) and with its other end via an inductance coil L1 and the main winding U, V of the motor to the phase conductor (L) of the AC-power supply. The auxiliary winding is with one end connected to the phase conductor (L) and with its other end via the main current circuit of a TRIAC Q2 of the TIC 206D type, manufactured by Texas Instruments, and the operation capacitor C to the neutral conductor (N). In order to suppress the interference signals generated by the phase-shift control, a capacitor C1 is connected between the phase conductor (L) and the neutral conductor (N). In parallel to the main current electrodes of the TRIAC Q1 a series circuit of a resistor R1 and a capacitor C2 is connected as a snubber circuit. Via a series resistor R2, the gate electrode of the TRIAC Q1 is connected to the terminal 4 of an integrated phase-shift circuit IC1 of the U211B type, manufactured by AEG.

Between the phase conductor and the neutral conductor there is further connected the primary winding of a transformer TR1, to the secondary winding of which a full wave rectifier circuit B1 is connected. The rectified secondary AC-voltage is used for the supply of the different electronic components, via a smoothing network, comprising a capacitor C3 and a resistor R3. The + pole is connected to the neutral conductor N.

The terminals 2 and 3, 5 of the phase-shift circuit IC1 are connected to the + and − pole, respectively, of the rectified AC-voltage. By means of a series circuit of a capacitor C4 and a potentiometer R5, connected with one end to a terminal 6 of IC1, the minimum effective output voltage of the load, i.e. the main winding, can be set.

The phase-shift circuit IC1 comprises a zero crossing detection circuit connected to terminal 17, said zero crossing detection circuit being connected via a resistor R6 to the phase conductor L of the power supply. The timing of the TRIAC Q1 is synchronized by this zero crossing detection circuit. The circuit IC1 is enabled above a predetermined voltage value, for the purpose of which its terminal 1 is connected via a series resistor R7 with the terminal W of the motor M. Between the terminal 7 of IC1 and the neutral conductor N a capacitor C5 is connected for purpose of controlling the phase-shift angle of IC1.

The circuit IC1 is provided with an internal voltage reference source, which is fed to the outside via the terminals 15, 16. In the excitation circuit use is made of this reference voltage for supplying the electronic components IC3, IC4 and OC1 for the processing of the signal of the tachometer and the control signals for setting the motor speed. The reference voltage is smoothed by means of a capacitor C17.

The circuit IC1 further comprises a comparator circuit, having input connected to terminals 10, 11, said converter. This comparator circuit being presettable via the terminals 10 and 12, by means of the minimum speed setting potentiometer R8 and the resistors R9, R10, R11, as well as the capacitors C7, C8, C9 and C10, which are connected as shown in the drawing.

The speed of the measuring fan in the preferred embodiment, or the speed of the motor, are measured by means of a tacho-generator. In one embodiment this tacho-generator comprises a circular magnet having four pairs of poles and three Hall-sensors of the TL170ILP type, manufactured by Texas Instruments, which are positioned at an angle of 60°. In another embodiment of the invention the tacho-generator comprises a stroboscopic disk D with two reflection sensors OC2 and OC3, type SFH900-3, manufactured by Siemens, said reflection sensors comprise a light emitting diode LED and a photo-transistor.

The resistors R40, R45 and R41, R46 are collector resistors for the photo-transistors and current setting resistors for the LEDs of OC1 and OC2, respectively. The non-inverting inputs 3, 5 of a first and second operational amplifier IC6a, IC6b, type TL062-CP, manufactured by Texas Instruments, are connected with the collector resistors R40, R45. The inverting inputs 2, 6 of IC6a, IC6b are connected to a voltage divider circuit R42, R43. Further, feed back resistors R38 and R39 are inserted between the output 1, 7 and the non-inverting inputs 3, 5 of each operational amplifier. The outputs 1, 7 of the operational amplifiers are connected to the terminals 5, 6 respectively 3 of a dual D-flipflop IC5, type HCF 4013 BE. By means of this circuit IC5 the rotation direction of the measuring fan is determined. The output 2 of IC5 is connected to terminal 8 of IC1 via a RC-network, comprising the resistors R13 R14 and R15 as well as the capacitors C13 and C14. Terminals 8 and 9 of IC1 are the input terminals of a frequency-voltage converter, accommodated in IC1 the output of which is internally connected to the input terminal 10 of the comparator circuit via an emitter-follower circuit comprising a NPN-transistor T1 and a resistor R16, the tacho-generator circuit and IC5 are fed from TR1 at a supply voltage determined by the reference voltage of IC1. By means of the resistor R12 and capacitor C12 connected with terminal 18 of IC1, a tacho-generator monitoring circuit of IC1 is set.

As already mentioned above, the measuring fan is constructed such that it has the least possible influence on the quantity of air displaced through the measuring tube 2. In the preferred embodiment the measuring fan rotates at a lower speed than the motor-driven fan.

The control signal for setting a desired motor speed is supplied to the terminals I1, I2. The frequency of said control signal, supplied by a controllable frequency source G is a criterion for the desired rotational speed, and consist of a square-wave voltage signal having a frequency between 9.3 and 186.6 Hz. In the circuit according to FIG. 2. the highest frequency corresponds to a motor speed of 1400 rpm and a 9.3 Hz signal corresponds to 150 rpm.

The control signal at the terminals I1, I2 is fed to the terminals 1, 2 of an optical coupling circuit OC1, type CNY64, manufactured by AEG, via a voltage limiting circuit B1 with load resistor R17. In this manner a galvanic separation is achieved between the excitation circuit and the control source. The optical coupling circuit OC1 comprises a setting resistor R18. The signal at the output terminals 3, 4 of OC1 is converted in a control voltage for the phase-shift circuit IC1 by means of a frequency-voltage converter IC4, type XR4151, manufactured by EXAR.

IC4 is set via its terminals 6, 7 and the resistors R19, R20, R21 and R22, which connected as voltage dividers. The response time of IC2 is set by means of a series circuit comprising a resistor R23 and a capacitor C13 connected to the terminal 5. The potentiometer R24, the resistors R25 and R26 as well as the smoothing capacitor C16, connected as shown, serve for setting the response time as well. Via its terminals 4 and 8 the supply voltage is fed to IC4.

The signal of the optical coupling circuit OC1 is fed via the coupling capacitor C15 to terminal 6 of IC4. The voltage controlled output signal corresponding to the frequency of the input signal is taken off at terminal 1 of IC4 and supplied to terminal 11 of the circuit IC1. Via an operational amplifier IC3, type CA3160, manufactured by RCA, connected as shown, said output signal is fed as well to the base of a NPN-transistor T2, with control resistor R27. In the main current path of T2 a LED D1 is connected via a series resistor R28. With the aid of this circuit the presence of a control signal and the supply voltage of TR1 is indicated.

The resistors R29, R30 connected with the non-inverting input terminal 3 of the operational amplifier IC3 constitute a threshold for the signal of the frequency-voltage converter IC4, applied to the inverting input terminal 2 of said operational amplifier IC3. The circuit IC1 is provided with a circuit for slowly speeding up the motor, said circuit can be set by means of de capacitor C6 connected with the terminal 13.

In order to control the TRIAC Q2 of the auxiliary winding of the motor M, there is provided a timer circuit IC2, type XRC 555, manufactured by EXAR. The control electrode of Q2 is connected to the output terminal 3 of IC2 via a PNP-transistor T3 with emitter resistor R31 and base resistor R32. The trigger-reset input 4 of IC2 is connected with the control signal output 4 of IC1 via resistor R34. The switching time of IC2 is determined by the RC-series circuit of resistor R33 and capacitor C19. Capacitor C20, connected to terminal 5 of IC2, serves to decouple the threshold voltage of IC2. The power of IC2, terminal 1, 8, is supplied via transistor T1. Capacitor C21 is a smoothing capacitor.

The motor housing additionally comprises an auto-reset temperature sensor E (clixon) with terminals E1, E2. Switching of said temperature sensor is signalled via a series resistor R35 and a supply resistor R36 to the control electrode of a thyristor TH1. When then sensor circuit is interrupted, a voltage pulse is supplied to the control electrode of TH1, which causes the latter to get conductive. The via resistor R37 series connected LED lights up. The diodes D3 and D4 together with a zener-diode D5 form a protection circuit for the LEDs D1, D2, respectively in reversed state. The excitation circuit functions as follows.

During normal operation the control signal at the input terminals I1, I2 is compared in the phase-shift circuit IC1 with the signal from the tacho-generator via IC5, on the basis of which the motor is more or less driven to full power, via Q1.

If the measured rotational speed drop below the minimum speed of 70 rpm, the control of the TRIAC is switched off, such that the motor comes to standstill. Then the motor is gradually speeded up departing from standstill. If no signal, or a signal smaller then the minimum speed of the tacho-generator is received, the voltage on the main winding of the motor is temporarily increased to the maximum value, in order to obtain the largest possible driving torque, in order to eliminate an eventual blocking of the fan. If the motor doesn't rotate after a certain time period, e.g. 90 sec, the complete excitation circuit is switched off. Reset is carried out by means of switching off and again switching on the supply voltage, if applicable after eliminating the cause of the blocking of the fan.

Switching off the temperature sensor in the motor as a result of an unacceptable temperature thereof, leads to a voltage drop in the supply voltage via TH1, such that IC1 cannot function anymore. When the temperature sensor after cooling off switches on again automatically, after giving a reset-command, i.e. switching off and on the supply voltage, the motor will gradually be speeded up again, as described above.

By means of the timer IC2 the control pulses for the main winding of the motor M are passed to the TRIAC Q2 of the auxiliary winding as well. The time cycle of the timer is preset at e.g. 5 minutes. As long as the TRIAC Q1 receives control pulses, the TRIAC Q2 of the auxiliary winding will maintain conductive as well. Only 5 minutes after the last ignition pulse for the main winding the auxiliary winding is switched off. The advantage thereof is that, in case the main winding is switched off, for example due to a too high motor temperature, the fan will keep rotating during some time and take care of a cooling of the motor. This will reduce fire risk.

Since the motor and the excitation circuit are incorporated in a common housing of electrically conductive material, it is possible, as is shown in FIG. 2, to use relatively simple means, like capacitor C1 to meet the actual shielding and filtering requirements for phase-shift controls for motors.

It will be apparent that the characteristics of the ventilating device according to the invention can be realized not only by the use of integrated circuits, but also in another manner, with the aid of separate electronic components or by a microprocessor-circuit. However, the use of integrated circuits will reduce costs. Further it is not per se necessary to incorporate all the additional facilities, as described in the independent claims.

We claim:

1. Ventilating device, comprising a fan, an electromotor mechanically coupled to said fan for driving the latter, said electromotor having at least one excitation winding, an excitation circuit having means for controlling the speed of the motor, said excitation circuit being electrically coupled to said at least one winding and having terminals for connecting a power source, means for detecting the speed of the fan, in use said speed detecting means generating a first electric signal, means for setting the motor speed, in use said speed setting means generating a second electric signal, said first and second electric signals being applied to the excitation circuit to excite said at least one winding such that the motor speed equals the speed set, wherein the excitation circuit comprises means for detection of the rotation of the fan with a speed below a presettable minimum speed, in response to which the excitation of the motor is interrupted, and it is also interrupted in any case at the detection of standstill of the fan, and wherein the excitation circuit comprises means for speeding up the fan departing from standstill with a motor driving torque less than maximum.

2. Ventilating device according to claim 1, having auto-reset detection means responsive to the motor temperature, for respectively interrupting and re-establishing the excitation of the motor.

3. Ventilating device according to claim 1, wherein the excitation circuit comprises means for temporarily increasing the excitation of the motor up to the maximum rotor driving torque in response to the detection of the rotation of the fan under said presetted minimum speed.

4. Ventilating device according to claim 1, wherein the speed detecting means is coupled with the motor, and wherein the excitation circuit, the speed detecting means, and the motor are accommodated in a common housing, said housing being provided with means for shielding interference signals generated by the excitation circuit.

5. Ventilating device according to claim 1, wherein the speed detecting means is coupled with a measuring fan positioned in the flow produced by the motor driven fan, the motor driven fan and the measuring fan are arranged in a measuring tube, spaced in axial direction, said measuring tube being provided with an inlet and outlet opening, wherein the excitation circuit, the speed detecting means and the motor are accommodated in a common housing, positioned between the spaced fans, said housing being provided with means for shielding interference signals generated by the excitation circuit.

6. Ventilating device according to claim 5, wherein the measuring fan is arranged at the inlet opening of the measuring tube, said measuring tube being provided with an outwardly tapered inlet flange.

7. Ventilating device according to claim 5, wherein the measuring fan comprises four blades, having their faces arranged at an angle of about 45° with respect to the face of the inlet opening.

8. Ventilating device according to claim 1, comprising an electromotor having a main and auxiliary excitation winding, wherein the excitation circuit is provided with means for successively time-delayed excitation of said main and auxiliary winding.

* * * * *